(12) United States Patent
Lackey

(10) Patent No.: US 8,125,218 B2
(45) Date of Patent: Feb. 28, 2012

(54) SENSOR ASSEMBLY FOR DETECTING POSITIONING OF A MOVEABLE COMPONENT

(75) Inventor: John J. Lackey, Elkhart, IN (US)

(73) Assignee: Continental Automotive Systems US, Inc., Auburn Hills ( * ) Notice: Subject to any disclaimer, the term of this patent is extended or adjusted under 35 U.S.C. 154(b) by 514 days.

(21) Appl. No.: 12/256,661

(22) Filed: Oct. 23, 2008

(65) Prior Publication Data

US 2009/0121708 A1 May 14, 2009

Related U.S. Application Data

(60) Provisional application No. 60/987,544, filed on Nov. 13, 2007.

(51) Int. Cl.
*G01B 7/14* (2006.01)
(52) U.S. Cl. ................... 324/207.24; 324/207.2
(58) Field of Classification Search ............... 324/207.2, 324/207.24
See application file for complete search history.

(56) References Cited

U.S. PATENT DOCUMENTS

| | | | |
|---|---|---|---|
| 3,375,512 A * | 3/1968 | Lang et al. ............... | 340/815.63 |
| 5,627,465 A | 5/1997 | Alfors et al. | |
| 5,670,876 A | 9/1997 | Dilger et al. | |
| 6,018,241 A * | 1/2000 | White et al. ............... | 324/207.2 |
| 6,175,233 B1 | 1/2001 | McCurley et al. | |
| 6,211,668 B1 | 4/2001 | Duesler et al. | |
| 6,304,078 B1 | 10/2001 | Jarrard et al. | |
| 6,577,123 B2 | 6/2003 | Schroeder et al. | |
| 6,586,929 B1 | 7/2003 | Luetzow | |
| 6,798,195 B2 | 9/2004 | Luetzow | |
| 6,867,582 B2 | 3/2005 | Muraji et al. | |
| 6,992,478 B2 | 1/2006 | Etherington et al. | |
| 7,034,523 B2 * | 4/2006 | Fahrlander et al. ......... | 324/207.2 |
| 7,088,096 B2 | 8/2006 | Etherington et al. | |
| 7,242,183 B2 | 7/2007 | Recio et al. | |
| 7,250,754 B2 | 7/2007 | Godkin | |
| 7,268,536 B2 | 9/2007 | Hagino et al. | |
| 2004/0017187 A1 | 1/2004 | Van Ostrand et al. | |
| 2005/0151535 A1 * | 7/2005 | Hagino et al. .............. | 324/207.2 |
| 2006/0061353 A1 * | 3/2006 | Etherington et al. ...... | 324/207.2 |

FOREIGN PATENT DOCUMENTS

WO 0221080 A1 3/2002

OTHER PUBLICATIONS

International Search Report and Written Opinion of the International Searching Authority for International application No. PCT/US2008/082725 mailed Apr. 6, 2009.
International Preliminary Report on Patentability for International application No. PCT/US2008/082725 mailed May 27, 2010.

* cited by examiner

*Primary Examiner* — Bot Ledynh

(57) ABSTRACT

A method of designing a sensor assembly having a housing, a first magnet and a second magnet includes forming each of the first magnet and the second magnet into a wedge shape. The method further includes tilting each of the first magnet and the second magnet at an angle within the housing.

13 Claims, 5 Drawing Sheets

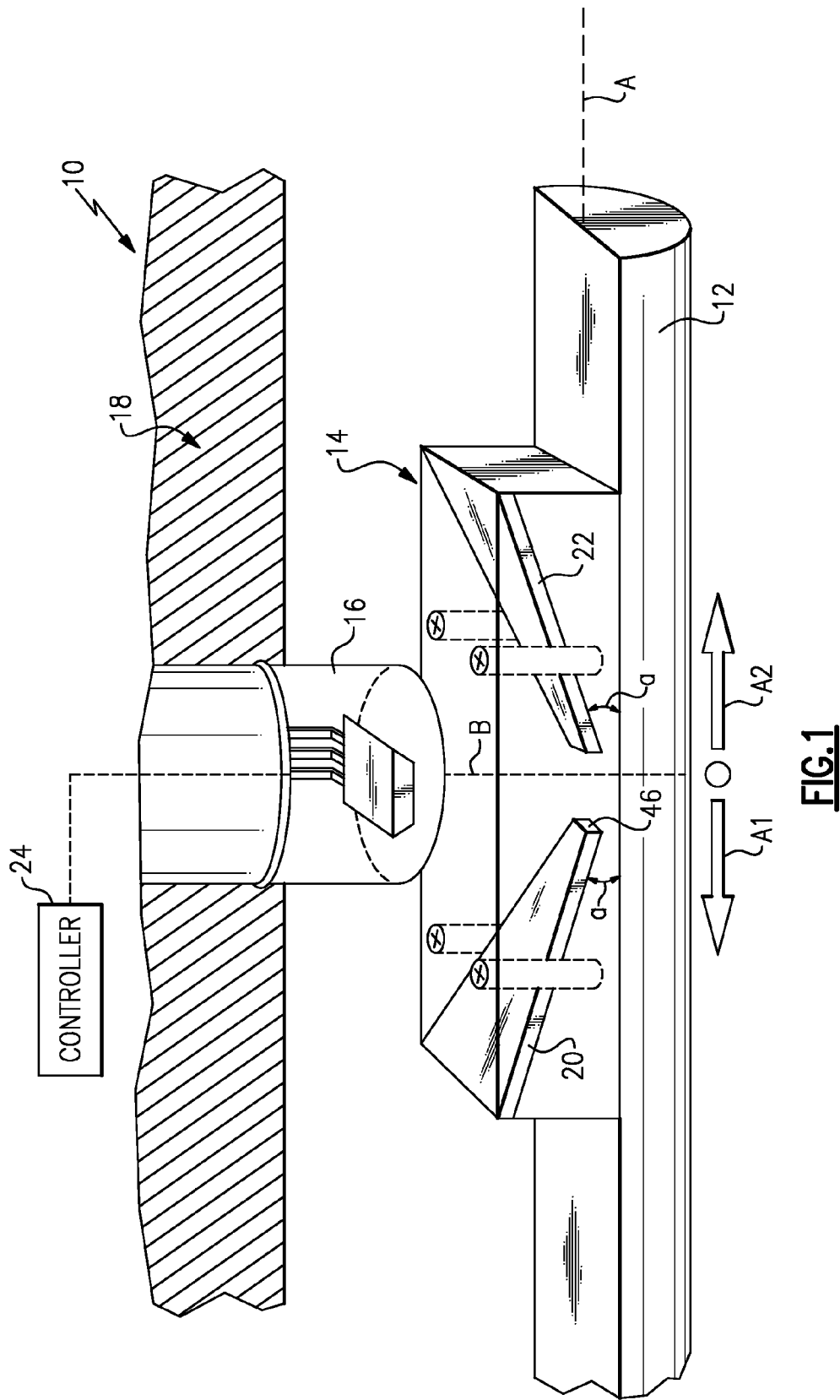

SENSOR ASSEMBLY FOR DETECTING POSITIONING OF A MOVEABLE COMPONENT

CROSS-REFERENCE TO RELATED APPLICATIONS

This application claims priority to U.S. Provisional Application No. 60/987,544, filed Nov. 13, 2007.

BACKGROUND OF THE DISCLOSURE

This disclosure relates generally to a sensor system, and more particularly to a sensor assembly for detecting a position of a moveable component.

Position sensing is often used to electronically monitor the position of a mechanical component. Position sensor assemblies, such as magnetic linear position sensors, are devices that provide a change in electronic signal strength that is proportional to the sensed movement of a mechanical component. For example, magnetic linear position sensors can monitor the position of various automotive components, including but not limited to, transmission shift rods, rotatable shafts, reciprocating levers, pedals or any other moveable members.

Sensor assemblies of this type typically include one or more magnets that generate a magnetic field having a magnetic field strength that varies as a function of position. The magnitude of the magnetic field strength is measured by an appropriate sensing device, such as a hall device, for example. The sensing device then generates an output signal, such as a voltage signal, that uniquely represents a specific position of a mechanical component relative to the magnetic field generated by the magnets of the sensor assembly.

A controller interprets the output signal communicated from the hall device and appropriately commands functionality in response to the interpreted output signal. For example, where the sensor assembly senses movement of a transmission shift rod of a vehicle, the vehicle controller interprets the output signal from the hall device and determines the gear that the vehicle transmission is operating in.

Designing sensor assemblies is often a complicated task. Many interdependent variables are involved in designing a sensor assembly for detecting a position of a moveable component that satisfies a customer's requirements with respect to stroke length (i.e., a total length of travel of the moveable component) and linearity. Linearity describes the graphic relationship between the linear positioning of the moveable component and magnetic field strength generated by the sensor assembly. A non-linear relationship between the linear positioning and the magnetic field strength can result in increased sensor assembly costs and complexity. Magnet material, height, thickness and length, gap distance between magnets, desired system stroke length, desired system field strength, as well as numerous other factors can affect the design capabilities of sensor assemblies. Known sensor assemblies have not adequately provided for variables in system stroke length, system field strength and linearity in all situations.

SUMMARY OF THE DISCLOSURE

A method of designing a sensor assembly having a housing, a first magnet and a second magnet includes forming each of the first magnet and the second magnet into a wedge shape. The method further includes tilting each of the first magnet and the second magnet at an angle within the housing.

A sensor system for detecting a position of a moveable component includes a sensor assembly having a first magnet and a second magnet, and a hall device. The sensor assembly is mounted to one of the moveable component and a static component. The hall device is mounted to the other of the moveable component and the static component. The first magnet and the second magnet include a wedge shape, and are angled relative to the hall component.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 illustrates an example sensor system for detecting the position of a moveable component;

DETAILED DESCRIPTION OF THE DISCLOSED EMBODIMENT

Figure 2A:
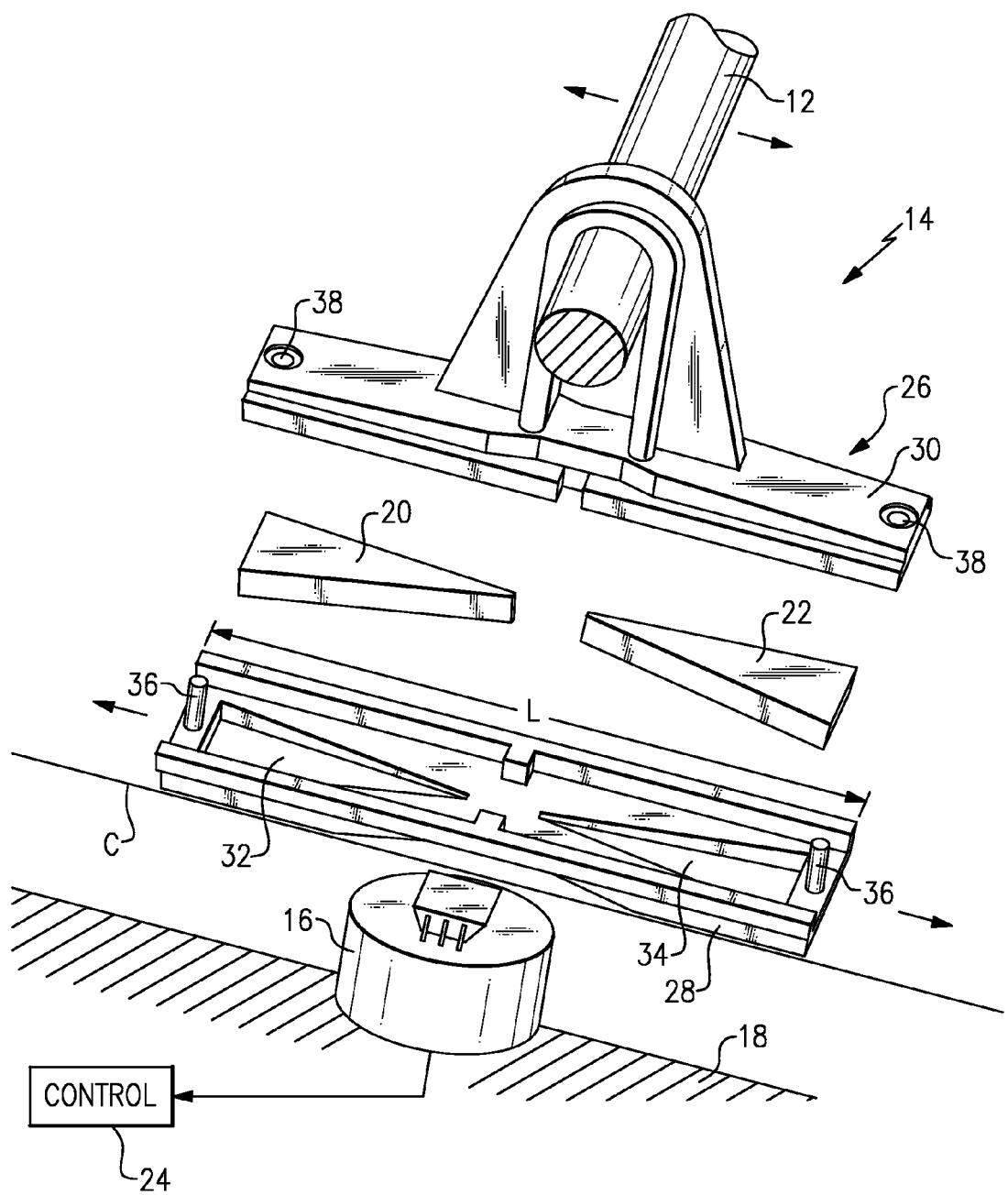
FIG. 2A illustrates an example sensor assembly for use within a sensor system.

FIG. 1 illustrates an example sensor system 10 for detecting a position of a moveable component 12. The moveable component 12 is a rotatable shaft, a reciprocating lever, a pedal or any other moveable member. In this example, the moveable component 12 is a transmission shift rod of a vehicle transmission that is axially translatable in the direction of arrows A1 and A2. However, it should be understood that the various features and advantages of this disclosure are applicable to detect a position of any moveable component, including non-automotive components.

The example sensor system 10 includes a sensor assembly 14 and a hall device 16. In one example, the sensor assembly 14 is a magnetic linear position sensor. However, other sensor assemblies are contemplated as within the scope of this disclosure. Any appropriate magnetoelectric transducer may be utilized as the hall device 16 of the sensor system 10. A person of ordinary skill in the art would be able to select an appropriate hall device for use therein.

In this example, the sensor assembly 14 is mounted to the moveable component 12 and the hall device 16 is mounted to a static component 18, such as a transmission main body, for example. However, an opposite configuration in which the hall device 16 is mounted to the moveable component 12 and the sensor assembly 14 is mounted to the static component 18 is contemplated as within the scope of this disclosure. The sensor assembly 14 and the hall device 16 are mountable in any known manner. In addition, although FIG. 1 illustrates linear (i.e., axial) movement of the moveable component 12, the sensor system 10 is operable to detect linear, rotational, arcuate or any other type of movement. The sensor system 10 may also be a contacting or non-contacting sensor system.

The sensor assembly 14 includes a first magnet 20 and a second magnet 22. In this example, the first magnet 20 and the second magnet 22 are wedge shaped. The first magnet 20 and the second magnet 22 are also angled relative to the hall device 16. The wedge shape and angular positioning of the first magnet 20 and the second magnet 22 provide improved linearity and improved stroke length to the sensor assembly 14, as is discussed in greater detail below.

The first magnet 20 and the second magnet 22 generate a magnetic field (i.e., magnetic flux density) that varies along a longitudinal axis A of the moveable component 12. The hall device 16 senses the strength of the magnetic field generated by the sensor assembly 14. In this example, the hall device 16 defines a sensing plane B oriented substantially perpendicular to the longitudinal axis A of the moveable component 12 and senses varying magnitudes of magnetic flux density during relative displacement of the moveable component 12.

The hall device 16 in turn generates an electronic output signal, such as a voltage signal, that is proportional to the magnitude of the sensed magnetic field strength. The electronic output signal generated by the hall device 16 is communicated to a controller 24 for further processing. For example, where the moveable component 12 is a component of a vehicle transmission, the hall device 16 communicates the electronic output signal to a microcontroller of the vehicle transmission to determine position information of the transmission component.

Figure 2B:
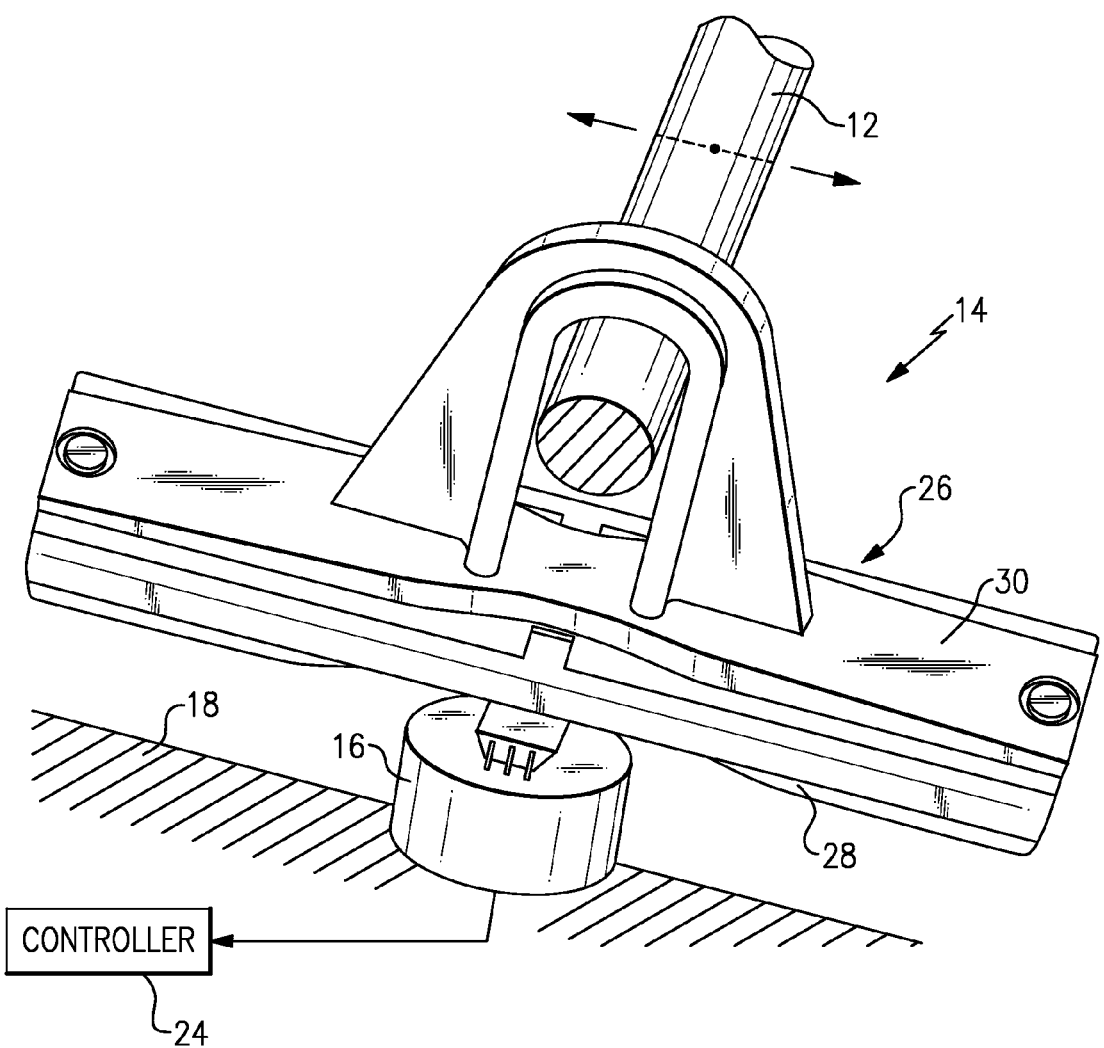
FIG. 2B illustrates another view of the example sensor assembly of FIG. 2A.

FIGS. 2A and 2B illustrate an example sensor assembly 14 of the sensor system 10 of FIG. 1. The sensor assembly 14 includes the first magnet 20, the second magnet 22 and a housing 26. The housing 26 substantially encases the first magnet 20 and the second magnet 22, in this example (see FIG. 2B). In one example, the housing 26 is made from a plastic material.

In this example, the housing 26 includes a base 28 and a cover 30. The base 28 defines a longitudinal axis C that extends along a length L of the base 28. The base 28 includes a first pocket 32 that receives the first magnet 20 and a second pocket 34 that receives the second magnet 22. The first pocket 32 and the second pocket 34 are sloped such that the first magnet 20 and the second magnet 22 are positioned within the base 28 at a position transverse to the longitudinal axis C of the base 28. In this example, the slope of the first pocket 32 is equivalent to the slope of the second pocket 34. In one example, the magnets 20, 22 are glued to the base 28. However, the magnets 20, 22 may be attached to the base 28 in any known manner.

In one example, the first pocket 32 and the second pocket 34 include an inclined slope (see angle a in FIG. 1). In another example, the first pocket 32 and the second pocket 34 include a declined slope (see FIG. 2A). Because the first magnet 20 and the second magnet 22 are received within the first pocket 32 and the second pocket 34, respectively, the magnets 20, 22 are tilted at an angle relative to the hall device 16 once the sensor assembly 14 is mounted to the moveable component 12 (see FIG. 1). The tilt of the magnets 20, 22 relative to the hall device 16 breaks the symmetry of the magnets 20, 22 and thereby improves the linearity of the sensor assembly 14.

The base 28 also includes posts 36 that are received by openings 38 of the cover 30 to secure the cover 30 relative to base 28 and thereby encase the first magnet 20 and the second magnet 22 within the housing 26. In one example, a fastener 40, such as a screw, is utilized to fasten the cover 30 relative to the base 28 (see FIG. 1). However, other fastening means are contemplated as within the scope of this disclosure.

Figure 3:
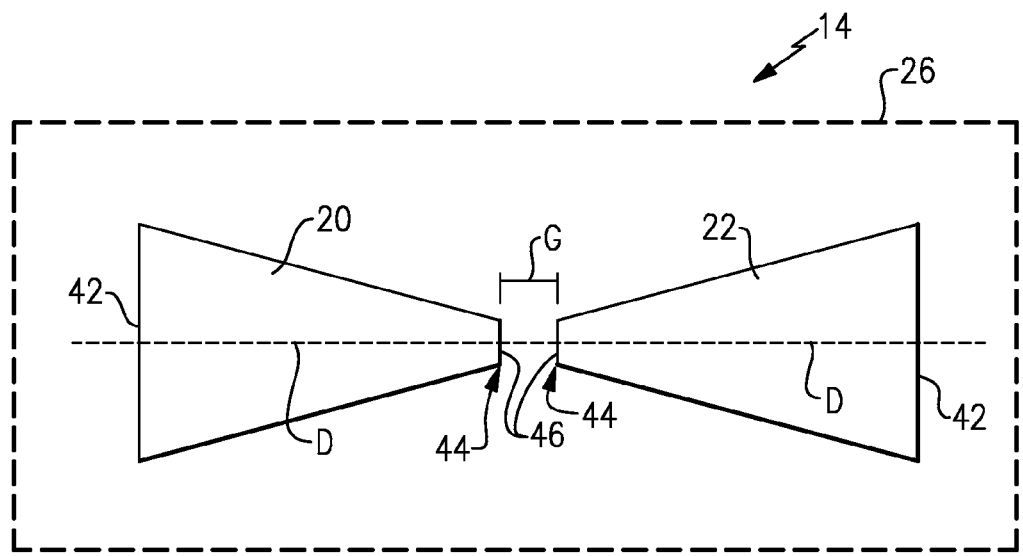
FIG. 3 illustrates example a top view of a sensor assembly having wedge shaped magnets.

FIG. 3 illustrates an example design of the first magnet 20 and the second magnet 22 of the sensor assembly 14. As stated above, the first magnet 20 and the second magnet 22 are wedge shaped, and in one example, are substantially triangular shaped. Each magnet 20, 22 includes an outer end 42 and an inner end 44. In one example, each of the first magnet 20 and the second magnet 22 are tapered between from the outer ends 42 towards the inner ends 44 to provide the wedge shaped design. That is, the magnets 20, 22 include a gradually reduced mass at their centerlines D from the outer ends 42 toward the inner ends 44.

The inner end 44 of the first magnet 20 is positioned adjacent to the inner end 44 of the second magnet 22 where received within the housing 26. That is, the magnets 20, 22 are flipped opposite to one another such that the magnets 20, 22 are coupled. A gap G extends between the inner end 44 of the first magnet 20 and the inner end 44 of the second magnet 22. The actual dimension of the gap G will vary depending upon design specific parameters including, but not limited to, the amount of stroke and linearity required. Either the inner ends 44 or the outer ends 42 may be tilted to provide the angular relationship between the magnets 20, 22 and the hall device 16.

The inner end 44 of each of the first magnet 20 and the second magnet 22 is formed with a flat front 46. The flat fronts 46 improve the structural integrity of the magnets 20, 22 and reduce the risk of fracture. The gap G extends between the flat fronts 46 of the first magnet 20 and the second magnet 22.

The first magnet 20 and the second magnet 22 are made of a ferromagnetic material. In one example, the first magnet 20 and the second magnet 22 are made from samarium cobalt. In another example, the magnets 20, 22 are made from neodymium-iron-boron. A person of ordinary skill in the art having the benefit of this disclosure would be able to select an appropriate material for constructing the first magnet 20 and the second magnet 22.

Figure 4:
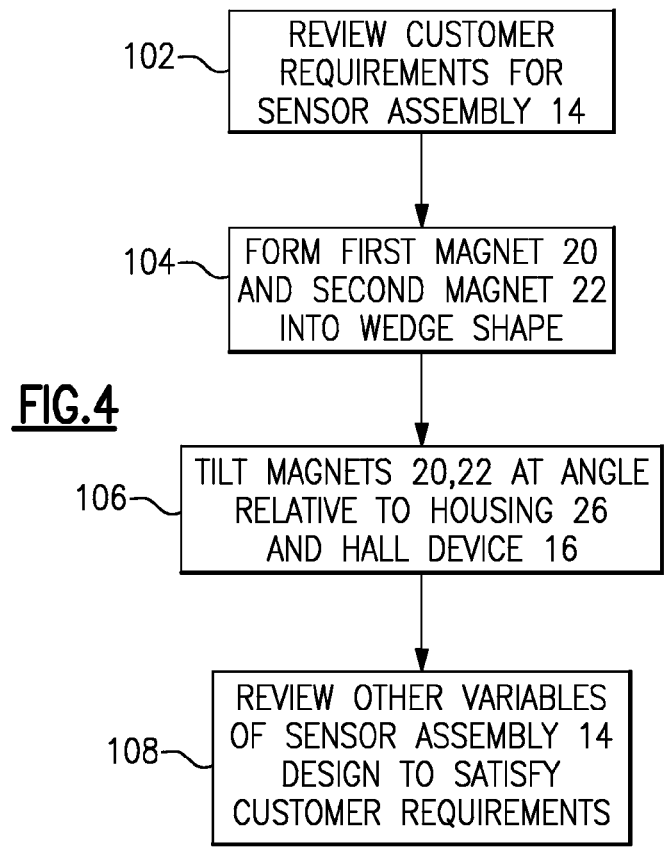
FIG. 4 illustrates an example method of designing a sensor assembly for detecting a position of a movable component.

FIG. 4, with continued reference to FIGS. 1, 2A, 2B and 3, illustrates an example method 100 of providing a sensor assembly 14 of the sensor system 10 to detect a position of moveable component 12. The example method 100 depicts an approach to model a sensor assembly 14 that satisfies different customer requirements for the sensor assembly 14 related to stroke and linearity.

The method 100 beings at step block 102 by reviewing customer requirements for the sensor assembly 14, including but not limited to, the stroke and linearity requirements of the customer. The first magnet 20 and the second magnet 22 are formed into a wedge shape at step block 104. In one example, the wedge shape is formed by performing multiple cuts inward toward the centerline D into square shaped magnets to form the first magnet 20 and the second magnet 22. In another example, the wedge shape is formed by tapering the first magnet 20 and the second magnet 22 from the outer ends 42 toward the inner ends 44 of each magnet 20, 22 such that the inner ends 44 include less material. The actual dimension of the wedge shaped magnets 20, 22 will vary depending upon the customer requirements. For example, the wedge shaped design of the magnets 20, 22 will vary between a customer that requires 55 mm of stroke length and another customer that requires only 26 mm of stroke length.

Next, at step block 106, the first magnet 20 and the second magnet 22 are tilted at an angle within the housing 26 of the sensor assembly 14 to further modify the design of the sensor assembly 14 and satisfy the stroke and linearity requirements of the customer. Therefore, the magnets 20, 22 are non-perpendicular relative to the sensing plane B of the hall device 16. In one example, the inner end 44 of each of the first magnet 20 and the second magnet 22 are tilted relative to the hall device 16 (See FIG. 3). In another example, the outer ends 42 of the first magnet 20 and the second magnet 22 are tilted relative to the hall device 16 (See FIG. 1). The angle of tilt is governed by the slope of the pockets 32, 34 formed within the base 28 of the housing 26, in this example. The actual angle of tilt of each magnet 20, 22 will vary depending upon the customer requirements for each specific application.

At step block 108, and if necessary, at least one of a magnet material, height, length, and thickness, a gap distance between the first magnet 20 and the second magnet 22, or any other variable related to the sensor assembly 14 may be altered to satisfy the customer requirements of the sensor assembly 14. It should be understood that the actual design of the sensor assembly, including the design of the magnets 20, 22 and the housing 26, will vary based upon the customer requirements for each specific application. The wedge shape and tilt angle of the magnets 20, 22 effects the manner in which the magnets 20, 22 interact with one another to provide the improved linearity and stroke length.

Figure 5A:
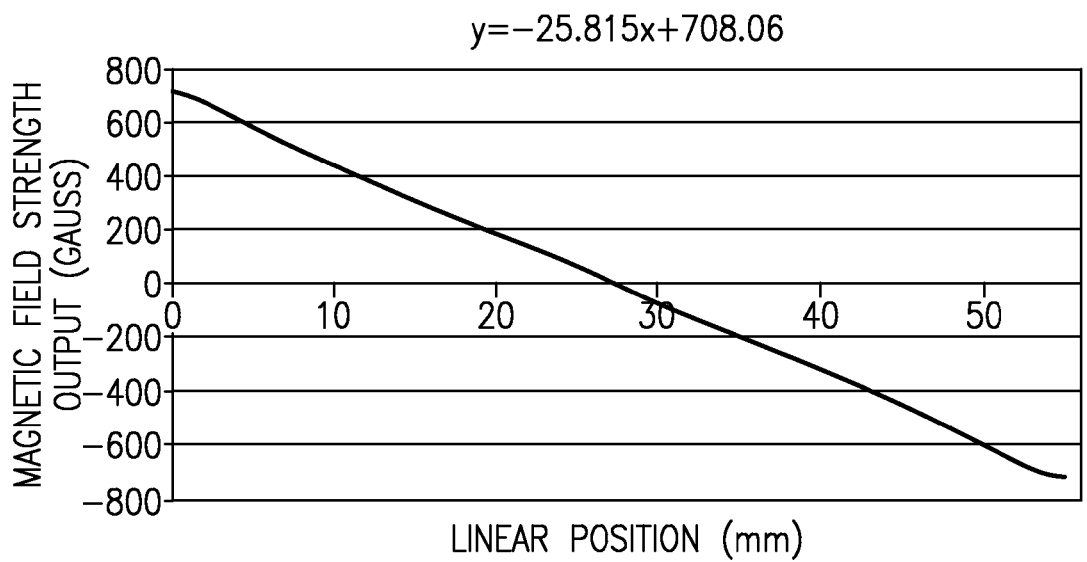
FIG. 5A is a graphical representation of a relationship between a linear positioning of a moveable component and a detected magnetic field strength of a sensor assembly.

FIG. 5A is a graphical representation of linear position (of the moveable component 12) versus magnetic field strength (of the sensor assembly 14 having wedge shaped and tilted magnets). As depicted by this graph, providing the sensor assembly 14 with wedge shaped and tilted magnets results in a substantially linear relationship between these variables. That is, linearity of the sensor assembly 14 is enhanced.

Figure 5B:
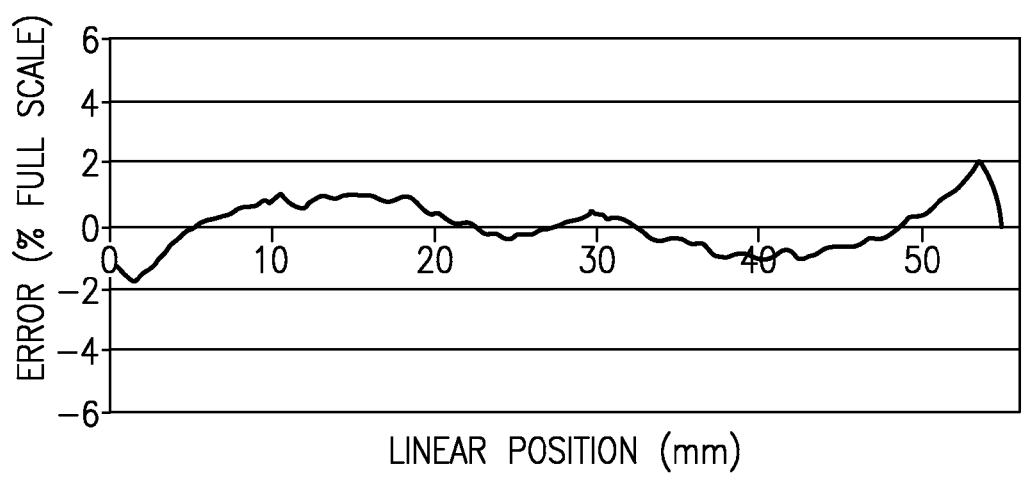
FIG. 5B is a graphical representation of a relationship between a linear positioning of a moveable component and linearity error of a sensor assembly.

FIG. 5B is a graphical representation of linear position versus linearity error of the sensor assembly 14 having wedge shaped and tilted magnets. An error of +/−2% is achieved (in this specific application) by providing the sensor assembly 14 with wedge shaped and tilted magnets. A person of ordinary skill in the art having the benefit of this disclosure would understand that a significant portion of this error is caused by the testing fixture utilized to test the sensor assembly 14 and is unrelated to the magnets 20, 22 of the sensor assembly 14.

The foregoing description shall be interpreted as illustrative and not in any limiting sense. A worker of ordinary skill in the art having the benefit of this disclosure would recognize that certain modifications could come within the scope of this disclosure. For these reasons, the following claims should be studied to determine the true scope and content of this disclosure.

What is claimed is:

1. A sensor system for detecting a position of a moveable component, comprising;
   a sensor assembly mounted to one of said moveable component and a static component;
   a hall device mounted to the other of said moveable component and said static component; and
   wherein said sensor assembly includes a first magnet and a second magnet, and said first magnet and said second magnet include a wedge shape and are angled relative to said hall component, said sensor assembly including a housing having a base and a cover, and said base defines a longitudinal axis that extends along a length of said base, wherein said base includes a first pocket that receives said first magnet and a second pocket that receives said second magnet, and each of said first pocket and said second pocket include a slope to position said first magnet and said second magnet at said angle relative to said hall device.

2. A method of providing the sensor assembly of claim 1, comprising the steps of;
   a) forming each of the first magnet and the second magnet into the wedge shape;
   b) tilting each of the first magnet and the second magnet at an angle within the housing; and
   c) encasing the first magnet and the second magnet within the housing.

3. The method as recited in claim 2, wherein the sensor assembly is a magnetic linear position sensor that detects a position of a vehicle component.

4. The method as recited in claim 2, wherein the wedge shape of the first magnet and the second magnet is generally triangular shaped.

5. The method as recited in claim 2, wherein said step a) comprises the step of;
   performing multiple cuts into square shaped magnets and toward a centerline of each of the square shaped magnets to form the wedge shape of the first magnet and the second magnet.

6. The method as recited in claim 2, wherein said step a) comprises the step of;
   tapering each of the first magnet and the second magnet from an outer end toward an inner end to form the wedge shape.

7. The method as recited in claim 2, wherein each of the first magnet and the second magnet include a inner end and an outer end and said step b) comprises the steps of;
   positioning the inner end of the first magnet adjacent to the inner end of the second magnet; and
   tilting the inner end of each of the first magnet and the second magnet relative to the hall device.

8. The method as recited in claim 2, wherein each of the first magnet and the second magnet include an inner end and an outer end and said step b) comprises the steps of;
   positioning the inner end of the first magnet adjacent to the inner end of the second magnet; and
   tilting the outer end of each of the first magnet and the second magnet relative to the hall device.

9. The method as recited in claim 2, wherein each of the first magnet and the second magnet include a inner end and an outer end and comprising the step of;
   d) positioning the inner end of the first magnet adjacent to the inner end of the second magnet.

10. The method as recited in claim 9, comprising the step of;
    e) forming a flat front on the inner end of each of the first magnet and the second magnet.

11. The method as recited in claim 2, comprising the step of;
    d) varying a dimension of the wedge shape formed in said step a) and the angle of tilt provided in said step b) in response to customer requirements.

12. The method as recited in claim 2, comprising the step of;
    d) varying at least one of a magnet material, a magnet height, a magnet length, a magnet thickness, and a gap distance between the first magnet and the second magnet to achieve a desired design of the sensor assembly.

13. The method as recited in claim 2, comprising the step of;
    d) mounting the hall device separate from and exteriorly to the housing.

* * * * *